United States Patent Office 3,347,650
Patented Oct. 17, 1967

3,347,650
LUBRICANT COATING FOR GLASSWARE
MOLDS AND EQUIPMENT
Marvin L. Barkhau, Elmore, Ohio, assignor to Owens-Illinois, Inc., a corporation of Ohio
No Drawing. Filed July 30, 1963, Ser. No. 298,566
11 Claims. (Cl. 65—26)

The present invention relates to lubricant coatings for metal surfaces and to methods of applying such coatings. More particularly, the invention relates to coatings for metal equipment used in the manufacture, forming, and handling of hot or molten glass, and to the method of treating metal surfaces which come into direct contact with the aforesaid glass whereby a durable, lubricative surface coating is formed on the metal, which coating prevents adhesion of the molten glass to the metal surface and, further, prevents the seizing of the glass at the elevated temperatures encountered in the forming of glassware objects.

In glass manufacturing, it is essential that all cast iron molding equipment which comes into contact with the glass at elevated temperatures retain its molding surface and not become pitted or roughened, so that the molten glass will readily flow over these surfaces, take the shape of the mold and the configuration of the mold surfaces, and then separate therefrom. The average surface or skin temperature of a gob of molten glass which is delivered to the glass-forming equipment is approximately 1600° to 1700° F. and, by the time the shaping and forming process is completed, it has cooled to between 1250° and 1350° F. While the glass is cooling during the formation of the ware, its viscosity increases as does its coefficient of friction. The decrease in plasticity, accompanied by a hardening of the glass, causes the mechanism of "slip" to change from one of viscous shear to "mixed film" or "stick-slip" effect, resulting in a rise in the drag on the molding equipment.

The "mixed-film effect" is defined as a mechanism of sliding wherein the irregular surfaces of the contacting materials touch, deform plastically, weld together and then break off at the weakest material. This shift in the mechanism of slip as the glass viscosity increases causes the coefficient of friction to change from a constant or gradually increasing quantity with viscous shear to a rapid increase with mixed-film.

In the past it has been the practice of glass manufacturers, in order to control the coefficient of friction and prevent the adhesion and seizing of glass, to coat the various equipment used in the manufacture and forming of glass with lubricants such as oil, rubber, sulfur, graphite compounds, beeswax or leather. In the course of the production of glass, the equipment coming into contact with the molten glass, such as the cast iron molds, becomes roughened in that a scale is formed thereon which contains not only the residue from such lubricants, but also the products of the reaction between the glass and the metal of the glass-forming equipment. These products are formed by the oxidation of the metal due to the corrosive nature of the molten glass and, when any scale particles flake off, they contaminate the glass surface, resulting in an imperfect ware. It has been the custom to remove this scale by scraping the mold with a hard stone, or other suitable material. However, this procedure not only alters the shape of the mold so that the mold is gradually worn away and its useful life is shortened, but also necessitates interruption of the production cycle and causes a costly shut-down of the equipment.

Various means by which glass producers have heretofore sought to eliminate this product have not been entirely satisfactory. For example, attempts have been made to plate nickel onto the glass-forming and glass-handling equipment, but this has not been suitable. Molybdenum disulfide which has been employed in the past is not stable at the required temperatures. Moreover, materials such as petroleum waxes and silicone oils require frequent application and form undesirable layers of waste material on the molds. When carbon or graphite is employed as a lubricant means, the high temperatures which are prevalent in such equipment result in the formation of a hard form of carbon which is lacking in lubricity.

Heretofore, equipment employed in glass manufacturing and forming, such as blanks, shears, scoops, cutoff knives, molds, and delivery equipment, have been lubricated by various means such as hand swabbing, spraying, and various automatic lubricating devices. Most of these methods of lubrication are undesirable because of operator-time consumption, inefficient lubrication, and shortened equipment life due to the build-up of residue from the lubricating material. For example, cast iron molds in glass-forming machines capable of turning out from several hundred to several thousand articles of ware per hour must be hand-swabbed with a lubricant material approximately every twenty minutes or so, in order to lower the coefficient of friction between the mold surface and the molten glass being shaped.

Accordingly, it is an object of this invention to eliminate and avoid all the shortcomings of the prior known methods for lubricating and coating metallic bodies and surfaces which come into contact with hot or molten glass at elevated temperature.

It is a further object of this invention to provide a method for treating cast iron surfaces, which are desired to come into contact with molten glass, so as to extend the operating life of glass-forming equipment containing such surfaces.

Another object of this invention is to provide a coating for cast iron surfaces which are to be contacted by molten glass, which coating is resistant to the normal oxidative and corrosive actions of the molten glass.

Still another object of this invention is to provide an article having a cast iron surface which is to be in intermittent contact with molten glass, wherein said surface has an oxidation- and corrosion-resistant coating thereon capable of maintaining a low coefficient of friction between the surface and the molten or softened glass in contact therewith.

A further object of this invention is to provide cast iron molds for forming glass articles from molten glass, which molds are treated with an oxidation- and corrosion-resistant coating which enables the molds to be used over a relatively longer period of time without further treatment of the surface.

In achieving the objects of this invention, one feature resides in providing a solid film lubricant on a cast iron surface which effectively reduces the coefficient of friction of the surface with respect to molten glass in contact therewith.

Another feature of this invention resides in providing a particular metallic oxide coating for cast iron surfaces of glass-forming equipment to resist the oxidative and corrosive action of molten glass which comes into contact with said equipment.

These and other objects and features of the invention will become apparent from the following detailed description of the invention.

It has now been discovered that by forming a thin tenaciously adhering metal coating on the surfaces of cast iron equipment which come into intermittent contact with hot or molten glass during the manufacture of various glass articles, excellent properties of lubricity, corrosion- and oxidation-resistance are obtained.

By the methods of this invention, the operational life, i.e., time between lubricating applications of the various glass-handling equipment such as glass article-forming molds, is extended from a few minutes to several hours. The molds and other glass-handling equipment when coated according to this invention need not be relubricated or swabbed every 15–20 minutes, but can remain in operation for many hours. It has been found that particular lead compounds, when applied to the glass-forming equipment according to the methods of this invention, will result in coatings which have the required high temperature stability, lubricative and durability characteristics when in contact with hot or molten glass.

In carrying out this invention, it is generally desirable to clean the surfaces of the cast iron equipment beforehand to remove all contamination such as metal oxides, loose particles, oils, dirt, and the like. Better adhesion and longer life of the coating are thereby assured.

It is preferred the cleaned piece of equipment be preheated on the order of 300–950° F., preferably about 900° F. Depending upon the cast iron composition, this preheating may be carried out practically in from 20 minutes to 2 hours.

The lead compound is then applied to the cleaned surfaces in a suitable manner, as will be described hereinafter. For any given thickness of the coating, it is more desirable to apply the lead compound in increments rather than all at once, since better adhesion of the coating to the surface is thus obtained.

In certain instances, it is advantageous to preheat the previously cleaned equipment surfaces to elevated temperatures within the range of from about 300° to 950° F. The optimum temperature range will, of course, depend upon the particular lead compound and the method of application, but will generally vary within the range of 400° to 700° F. In the preferred embodiment of the invention, the surface to be coated is alternatively subjected to heating and to application of the lead compound, but care must be taken to prevent overheating the metal substrate to temperatures above about 1000° F.

After the coating operation is completed and the article is at a temperature corresponding to its operating temperature, e.g., 800°–900° F. in the case of a glass bottle mold, the coated surface can be polished or buffed with cloth to remove the unbonded particles from the surface and to aid in smoothing out the coating. Although the dimensions of the coatings can vary, it has been found that the thickness of the resulting coating should be approximately 0.001 to 0.002 inch to insure the desired lubricative and wear characteristics. However, even with a coating of 0.0002 inch a noticeable improvement in lubricity is achieved.

Among the lead compounds which are suitable for purposes of the present invention is lead monoxide (PbO). When employing the lead oxide, it is generally preferred to apply the coating by means of a commercially available oxygen-acetylene torch designed to flame-spray finely powdered materials. This method of application is highly successful because satisfactory bonding of the solid lubricative material to the cast iron surface is obtained without the presence of binders or adhesives. The flame-spray method is further advantageous in that it eliminates the necessity for fusing or curing cycles in ovens and furnaces.

In an alternative method, the lead oxide can be applied in a mixture together with boron oxide ($B_2O_3$) and graphite. The boron oxide is believed to function as a fluxing agent in attaching the lead oxide to the cast iron surface. Moreover, it further acts to lower the melting point of the coating mixture, thereby permitting lower temperatures for application of the coating.

When employing the lead monoxide-boron oxide-graphite coating mixture, a suspension or slurry of these materials in the correct proportions is made up in an aqueous solution generally containing an alcohol. This slurry is applied to the unheated metallic surface. Thereupon the metallic surface is heated to an elevated temperature, generally at least 250° F., for sufficient duration to permit the coatings to thoroughly dry. Usually about 30 minutes will be sufficient, although shorter periods at higher temperatures will also produce the desired results. After drying, the treated object is heated to much higher temperatures which are used to cure coatings, e.g., 15 minutes at 1000° F.

The proportions of the composition can vary considerably, but it has been found that in the range of about 85%–99% lead monoxide, 10% to 0.5% boron oxide and 5% to 0.5% graphite produce satisfactory results, but a composition of about 90% lead monoxide, 5% boron oxide and 5% graphite is preferred. Under these conditions of application, these proportions insure adequate corrosion- and oxidation-resistance and, at the same time, produce excellent adherence of the coating to the cast iron. It is important that substantially no boron oxide comes into contact with the glass since this substance will react with the glass. The boron oxide tends to migrate to the cast iron where it is believed to bond or anchor the coating to the cast iron.

Also included in the lead compounds which may be employed for purposes of this invention is lead acetate. When lead acetate is used, the cast iron surface, after being cleaned, is customarily preheated to elevated temperatures, for example 600° F. The heating is carried out so that the desired temperature is attained after a period of about 20 minutes to 2 hours. It has been found that satisfactory results are achieved by heating a mold to the preheat temperature range of 400°–700° F. in about 5 minutes and holding at that temperature for at least 15–20 minutes.

The lead acetate is applied in the form of a solution in water. The concentration of this composition is placed at about 20% as a matter of convenience. This liquid is sprayed in a fine mist onto the preheated surface. Thereafter the treated surface is subjected to further heating. It is desirable to make several passes for multiple applications of the lead compound, rather than one application to deposit the total thickness. Between the applications of the spray mist the metal surface undergoing the treatment is subjected to heating. The intermittent heating works to dry out the coating as well as partially pyrolyze it. The maximum surface temperature of the metal during this process is approximately 600° F.

In actual operation, the cast iron article, such as a mold, ready for coating can be conveniently mounted on a rotating turntable. A spray gun delivering the fine mist spray of solution is mounted level with the work piece and is aimed at the metal surface which is to eventually contact the molten glass. At a convenient distance from the spray gun, about 90° along the circumference of the turntable and spaced therefrom, is mounted a flame gun which functions as a source of heat and is focused on the cast iron surface to be treated. The turntable can revolve at a suitable speed ranging, for example, from 5–10 ft./sec. radial velocity. It is preferred to spray the cast iron surface several times with the lead acetate solution to build up a white coating before the flame gun is turned on to continue the heating step. The mold surface is exposed to the alternate treatment of spraying with metal and the application of a flame for a total time of about 5 minutes, which is sufficient to form a suitable metallic coating on the metal surface.

The lead oxide coatings as well as the supplemental coating must have a hardness such that it is not greater than the material against which it is sliding. Thus, in general, it never exceeds a Moh hardness value of 5. At temperatures of 1600° F. or above, molten glass offers little drag to a body immersed therein, provided no corrosion or oxidation of said body takes place. This tends to indicate that little lubrication is necessary at above 1600° F. Thus, the lubricant which is employed for coating glass molds and glass making equipment must be stable up to at least 1600° F. The lead compound coatings of the present invention fulfill this requirement. The hardness of the lead lubricant is also less than that of the glass material against which it is sliding. Because the lead compound coatings are stable to oxidation, no oxidation residues or corrosion products flake off the surface of the equipment and contaminate the glass batch.

The following examples are to be considered as merely illustrative of the invention and do not limit the scope thereof in any manner.

EXAMPLE I

A standard cast iron blank mold employed in molding bottles from molten glass was cleaned by first wiping with a No. 320 grit emery cloth to free it from loose particles of dirt and metal, and subsequently washed with ethyl alcohol. The clean mold was preheated at 400° F.

The spray mixture, prepared by mixing 80 parts of lead monoxide powder and 20 parts graphite, was used with a commercially available oxy-acetylene torch wherein the air pressure for the powder feed apparatus was set at 30 p.s.i. The torch pressure setting was 8 p.s.i. for the oxygen and 4 p.s.i. for the acetylene. The graphite was used to facilitate spraying of the lead monoxide and also to help break up caking or packing of the PbO in the powder-feeding apparatus.

The torch tip was set a distance of 4 inches from the surface of the mold mounted on a turntable which revolved at a rate such that the surface of the mold traveled at a rate of 10 feet/second with respect to the spray torch.

The flame-spraying cycle operation consisted of one application of the lead oxide mixture with the oxy-acetylene torch followed by two passes of the torch wherein only the flame was applied to the coated surface. After ten cycles, the thickness of the desired film on the surface was approximately 0.001 inch. Initially, the lead oxide was yellow, but after the oxy-acetylene heating it formed a graying black color.

In order to evaluate the efficiency of the coatings produced by the methods of this invention, it was determined to compare the values of coefficient of friction after a designated period of "in-service" use of the glass-forming equipment. To measure the friction resulting from contact between a cast iron surface coated according to the methods of this invention and molten glass at high temperature, a testing apparatus was devised which would measure the variation of the drag of molten glass on cast iron. This testing apparatus included a cast iron wheel turning in contact with molten glass. Since an electric motor turning a wheel, when driven by a constant voltage source, will attempt to maintain constant speed even though subjected to drag forces by drawing an increased amount of current, a constant-voltage-driven motor was connected in series with a recording ammeter that permitted recording the variation in amperage. The values of the coefficient of friction obtained by this procedure are expressed as a proportional value related to the percent of scale change on the ammeter. Thus, a value of zero represents the wheel turning in air.

When this test method was employed on the treated blank of Example I it showed a coefficient of friction of 0.2 after two hours of use. The untreated sample had a value of 0.38 after the same period of time.

EXAMPLE II

Another blank mold, similar to the one employed in Example I, was coated following the same procedure used in the foregoing Example with the exception that the spray mixture contained 95 parts of lead monoxide and 5 parts of graphite.

After treatment, the blank was tested with the same apparatus described in Example I and measured a coefficient of friction of 0.3 after two hours of usage, whereas an untreated blank showed a coefficient of friction of 0.38.

EXAMPLE III

A blank mold similar to that of Example I was treated according to the procedure of Example I. The only variation was in the spray mixture which consisted of 100% lead monoxide.

The blank mold was tested by the same procedure employed in Example I, and measured a coefficient of friction of only 0.25 after two hours of service.

EXAMPLE IV

A cast iron mold was prepared by first wiping with a No. 320 grit emery cloth to remove burrs and dirt. Thereafter, the mold was cleaned and degreased with alcohol.

A composition of the following ingredients was employed in a spray treatment:

| | Parts by weight |
|---|---|
| Lead monoxide | 90 |
| Boron oxide | 5 |
| Graphite | 5 |

The composition was sprayed onto the mold at room temperature, employing a conventional spraying apparatus. The mold was thereafter heated at about 250° F. for 30 minutes to dry out the coating and then heated to pyrolyzing temperature of 1000° F. for 15 minutes.

The mold coated by the foregoing procedure measured a coefficient of friction of 0.225 after 2 hours of service.

EXAMPLE V

A blank mold similar to that of Example I was cleaned and degreased in the usual manner as described in Example I.

The mold was mounted on a turntable revolving at about 150 r.p.m. so that the mold was traveling about 5 feet/second. The mold was heated to about 400° F. within 5 minutes and held there for 20 minutes. Using a 20% aqueous solution of lead acetate, the mold was sprayed with a fine mist until a faint white coating appeared on the surface. Then with continued application of the lead acetate solution, a flame was used to reheat the coated surface until it became orange.

Further tests showed the superiority of the coatings produced by the methods of this invention. A test of a treated surface made by the flame spray process showed good high-temperature behavior and was operated in service on a glass machine for 10 hours before refinishing was required. The molds treated with conventional greases specifically designed for glass-forming equipment required reapplication of grease after 20 to 30 minutes of service, and showed only fair high-temperature behavior.

The results obtained in the above examples demonstrate how the methods of the present invention result in an operational life that is many times greater than the operational life of various other coatings.

By the process of this invention great savings in time and cost are achieved, since it is now possible to run glass-forming and handling equipment for considerably longer periods of operating time, as well as eliminate the necessity of hand swabbing the molding equipment.

Although in the foregoing discussion and examples the invention has been emphasized with particularly in relation to lead monoxide and lead acetate, it is within the purview of this invention to employ other lead compounds, such as lead formate, lead thiocyanate, lead cyanide and, in general, any organic lead compound capable of pyrolysis under the conditions employed. Moreover, various binders, such as waxes, plastic or resin binders, can be employed, provided they volatilize and leave the mold free of residual carbon.

While I have described and illustrated a preferred embodiment of my invention, I wish it to be understood that I do not intend to be restricted solely thereto, but that I do intend to cover all modifications thereof which would be apparent to one skilled in the art and which come within the spirit and scope of my invention.

Having thus fully described the invention what is claimed is:

1. A method of lubricating the cast iron surfaces of a glassware mold that comes into intermittent contact with molten glass, comprising applying a lead compound selected from the group consisting of lead monoxide and an organic lead compound capable of pyrolysis to lead oxide to the said cast iron surface and subjecting said surface to elevated temperature for a sufficient length of time to form an adherent coating comprising lead oxide.

2. The method as defined in claim 1 wherein the lead compound is lead monoxide.

3. The method as defined in claim 1 wherein the lead compound is lead acetate.

4. A method of lubricating the surfaces of a shaped cast iron article, which surfaces come into intermittent contact with molten glass, comprising preheating the surfaces to a temperature of approximately 300 to 950° F. and thereafter applying a lead compound selected from the group consisting of lead monoxide and an organic lead compound capable of pyrolysis to lead oxide to the said surfaces of the shaped article while the said surfaces are maintained at the stated elevated temperature to form an adherent coating comprising lead oxide.

5. The method as defined in claim 4 wherein the lead compound is lead oxide.

6. The method as defined in claim 4 wherein the lead compound is lead acetate.

7. A method of lubricating the cast iron surfaces of a glassware mold, which surfaces come into intermittent contact with molten glass, comprising applying to said cast iron surfaces a composition comprising lead monoxide, boron oxide and graphite, and heating said mold and said composition to an elevated temperature sufficient for said composition to form a firmly adhering coating on said surfaces.

8. The method as defined in claim 7 wherein the composition comprises from about 85% to 99% lead monoxide, 0.5% to 10% boron oxide, and 0.5% to 5% graphite.

9. A method of lubricating the cast iron surfaces of a glassware mold, which surfaces come into intermittent contact with molten glass, comprising applying to said cast iron surfaces a solution of lead acetate while the said mold is at elevated temperatures and thereafter subjecting said surface to further heating at elevated temperature for sufficient length of time to form an adherent coating comprising lead oxide.

10. A method of lubricating the cast iron surfaces of a glassware mold, which surfaces come into contact with molten glass, comprising flame-spraying lead oxide onto the surface of said mold until a layer of from .0002 to about .002 inch of PbO is formed on said surfaces.

11. An article having a cast iron surface which comes into contact with molten glass, said surface having a film comprising lead oxide formed thereon and tenaciously bonded to said surface.

References Cited
UNITED STATES PATENTS

| | | | |
|---|---|---|---|
| 142,573 | 9/1873 | Lydiatt | 65—26 |
| 1,422,036 | 7/1922 | Crowley et al. | 65—26 |
| 2,966,423 | 12/1960 | Shichman | 117—5.3 |

DONALL H. SYLVESTER, *Primary Examiner.*

S. LEON BASHORE, *Examiner.*

A. D. KELLOGG, *Assistant Examiner.*